United States Patent [19]

Masunaga

[11] Patent Number: 5,751,394
[45] Date of Patent: May 12, 1998

[54] ADJUSTABLE TEMPLE FRAME MOUNTING STRUCTURE IN SPECTACLES

[75] Inventor: Satoru Masunaga, Fukui, Japan

[73] Assignee: Masunaga Optical Mfg. Co., Ltd., Japan

[21] Appl. No.: 774,862

[22] Filed: Dec. 24, 1996

[30] Foreign Application Priority Data

Sep. 26, 1996 [JP] Japan ................. 8-009689 U

[51] Int. Cl.⁶ ..................... G02C 5/20; G02C 5/16
[52] U.S. Cl. ............... 351/118; 351/113; 351/119
[58] Field of Search ..................... 351/111, 113, 351/116, 118, 119, 121, 140

[56] References Cited

U.S. PATENT DOCUMENTS

| | | | |
|---|---|---|---|
| 3,759,608 | 9/1973 | McVeigh | 351/113 |
| 4,047,809 | 9/1977 | Zuccatti | 351/118 |
| 4,848,891 | 7/1989 | Lee | 351/118 |
| 4,848,892 | 7/1989 | Sonthonnax | 351/118 |

*Primary Examiner*—Huy Mai
*Attorney, Agent, or Firm*—Lorusso & Loud

[57] ABSTRACT

The present invention relates to a temple frame mounting structure in spectacles. A notch portion is provided in a part of an annular side of a lens frame, and a pair of clamped pieces are fixed at positions of the lens frame between which the notch portion is positioned, and have distal ends extending apart from the lens frame in a direction of eyes. The clamped pieces are guided to the groove-like clamp pedestal having a pair of bearing portions on both sides, and are clamped to the clamp pedestal by a cam piece horizontally movably and pivotally mounted to the bearing portions of the clamp pedestal, thereby pivotally mounting the temple frame to an end of the cam piece.

6 Claims, 5 Drawing Sheets

ADJUSTABLE TEMPLE FRAME MOUNTING STRUCTURE IN SPECTACLES

BACKGROUND OF THE INVENTION

1. Field of the Invention

This invention relates to a temple frame mounting structure in spectacles.

2. Description of the Prior Art

In conventional spectacles, a temple frame is horizontally movably and pivotally mounted to a bearing portion secured to a side of a lens frame through a hook-like attachment.

In particular, in conventional spectacles having a metallic lens frame, an annular side of the lens frame has an intermittent portion, and a pair of clamp pieces are secured to the lens frame astride the intermittent portion. Further, the hook-like attachment is secured to one of the clamp pieces, and the bearing portion is fixed at an end of the attachment. After a lens with its external form finished is guided to the lens frame, the pair of clamp pieces are clamped through machine screws, thereby clamping and fixing the lens to the lens frame. Thereafter, the temple frame is horizontally movably and pivotally mounted to the bearing portion.

In the conventional temple frame mounting structure, the temple frame is pivotally mounted to the bearing portion secured to the side of the lens frame through the attachment. Hence, it is impossible to adjust a length of the temple frame according to a size of a spectacles users' face, or according to user's tastes at different times or the circumstances.

Further, in order to mount the lens to the lens frame, it is necessary to loosen and remove the machine screws from the pair of clamp pieces fixed to the lens frame, and guide the lens to the frame, thereafter tightening the machine screws. As a result, the mounting operation and replacement of the lens take a lot of labor, and require a sophisticated tool.

SUMMARY OF THE INVENTION

In view of the foregoing, it is an object of the present invention to provide a temple frame mounting structure in spectacles, in which a spectacles user is able to adjust a substantial length of a temple frame within a predetermined range as required.

It is another object of the present invention to provide a temple frame mounting structure in spectacles, in which it is possible to very easily fix a lens to a lens frame, and replace the lens.

For achieving the above-mentioned objects, according to the present invention, there is provided the following temple frame mounting structure in spectacles.

That is, according to the first aspect of the present invention, there is provided a temple frame mounting structure in spectacles, comprising:

a lens frame with a notch portion provided in a part of an annular side;

a pair of clamped pieces fixed at positions of the lens frame between which the notch portion is positioned, and having distal ends extending apart from the lens frame in a direction of eyes;

a clamp pedestal with a pair of bearing portions formed on both sides, and having a groove-like portion into which the pair of clamped pieces are guided while an interval therebetween becoming narrower;

a cam piece horizontally movably and pivotally mounted to the bearing portions of the clamp pedestal, and including a base end having a cam portion to press the pair of clamped pieces guided to the clamp pedestal to the side of an inner bottom portion of the clamp pedestal when the cam piece is closed to extend along the clamp pedestal; and a temple frame horizontally movably and pivotally mounted to a distal end of the cam piece or a part of the clamp pedestal in a state in which the temple frame is capable of being closed on the side of eyes.

According to the second aspect of the present invention, there is provided the temple frame mounting structure in spectacles according to the first aspect of the present invention, in which an inner bottom portion of the clamp pedestal is formed to have a slightly deep intermediate portion.

According to the third aspect of the present invention, there is provided a temple frame mounting structure in spectacles, comprising:

a lens frame with a notch portion provided in a part of an annular side;

a pair of clamped pieces fixed at positions of the lens frame between which the notch portion is positioned, and having distal ends extending apart from the lens frame in a direction of eyes;

a cylindrical or dovetail groove-like clamp into which the pair of clamped pieces are inserted while an interval therebetween becoming narrower; and a temple frame horizontally movably and pivotally mounted to a part of the clamp in a state in which the temple frame is capable of being closed on the side of eyes.

According to the fourth aspect of the present invention, there is provided the temple frame mounting structure in spectacles according to the third aspect of the present invention, in which an irregularity is formed on at least one of the clamped pieces on the side opposed to the mutually opposite sides of the clamped pieces to extend along a longitudinal direction of the clamped piece, and a convex portion is provided on the inside of the clamp to be anchored by the irregularity when the clamped pieces are inserted into the clamp.

According to the fifth aspect of the present invention, there is provided the temple frame mounting structure in spectacles according to the first or third aspect of the present invention, in which distal ends of the clamped pieces are integrally provided to have a substantially U-shaped or V-shaped total form thereof.

In the temple frame mounting structure in spectacles according to the first aspect of the present invention, the following effects are provided.

First, since the lens is capable of being fixedly held at the lens frame by simply fitting the clamp pedestal with the clamped pieces in an inserting manner, it is very easy to fix the lens to the lens frame, and replace the lens.

Second, it is possible to fix the temple frame to the clamped pieces by inserting the clamped pieces into the clamp pedestal, and closing the cam piece. Thus, it is very easy to mount or replace the temple frame.

Third, it is possible to easily adjust the substantial length of the temple frame in the range of the length of the clamped pieces by an amount of insertion of the clamped pieces into the clamp pedestal.

In the temple frame mounting structure in spectacles according to the second aspect of the present invention, the deep intermediate portion is formed on the inside of the clamp pedestal. Thus, the clamped pieces are clamped to the clamp pedestal in a slightly curved manner so that the cam piece is able to cause a more preferable clamp operation.

3

In the temple frame mounting structure in spectacles according to the third aspect of the present invention, the following effects are provided.

First, since the lens is capable of being fixedly held at the lens frame by simply fitting the clamp pedestal with the clamped pieces in the inserting manner, it is very easy to fix the lens to the lens frame, and replace the lens.

Second, it is possible to fix the temple frame to the clamped pieces by inserting the clamped pieces into the clamp by a predetermined amount. Thus, it is very easy to mount or replace the temple frame.

Third, it is possible to easily adjust the substantial length of the temple frame in the range of the length of the clamped pieces by the amount of insertion of the clamped pieces into the clamp.

In the temple frame mounting structure in spectacles according to the fourth aspect of the present invention, the irregularity is provided for the clamped pieces, and the convex portion is provided on the inside of the clamp to be anchored by the irregularity. Thus, the clamp is hard to be released from the clamped pieces.

In the temple frame mounting structure in spectacles according to the fifth aspect of the present invention, the clamped pieces are integrally provided to have the U-shaped or V-shaped total form thereof. As a result, the clamped pieces are capable of being easily inserted into the clamp pedestal or the clamp, and a larger clamp force is applied to the lens.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Embodiment 1

Figure 1:
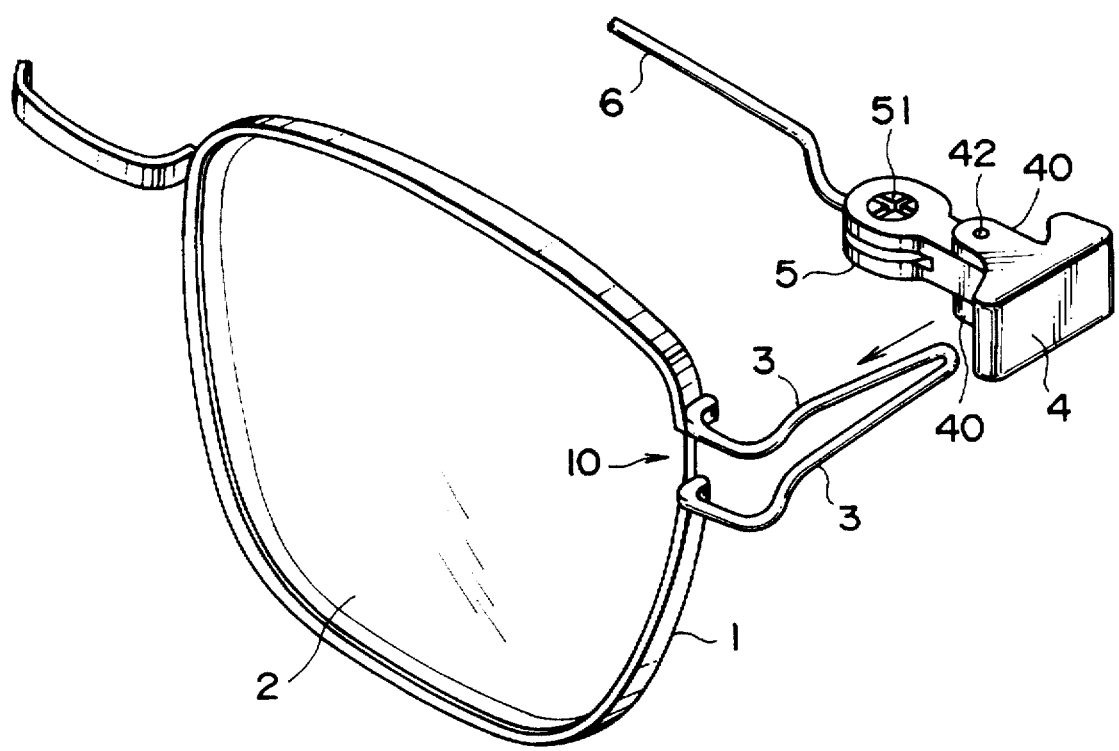
FIG. 1 is a partial perspective view showing the embodiment 1 of a temple frame mounting structure in spectacles according to the present invention.

The embodiment 1 will be described with reference to FIGS. 1 to 4.

Reference numeral 1 means a metallic lens frame to which a lens 2 is mounted. In the lens frame 1, a notch portion 10 is formed in a part of an annular side.

A pair of clamped pieces 3, 3 are bent to have a substantially L shape as seen vertically, and base ends of the clamped pieces 3, 3 are secured through welding to ends of the lens frame 1 between which the notch portion 10 is positioned. The clamped pieces 3, 3 include a metal wire having an appropriate thickness and elasticity, and distal ends of the clamped pieces 3, 3 extend apart from the lens frame 1 in a direction of eyes. Further, the clamped pieces 3, 3 are integrally provided to have a U-shaped or V-shaped total form.

Figure 2:
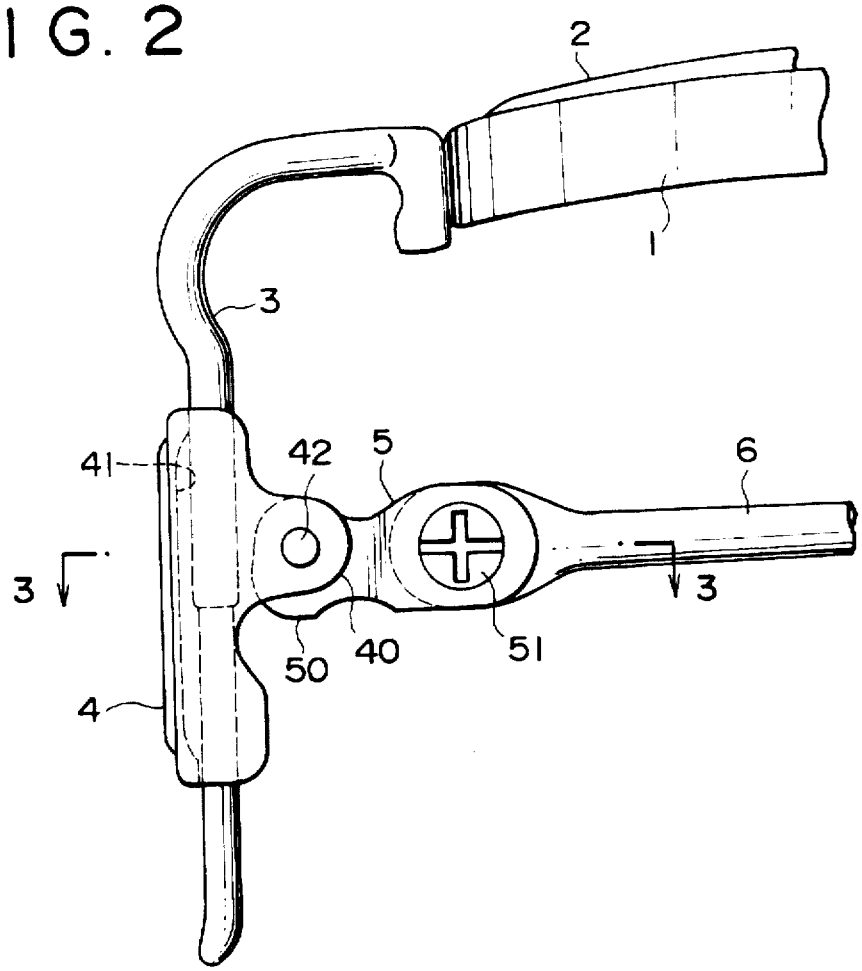
FIG. 2 is a partially enlarged plan view showing a state immediately before the temple frame of FIG. 1 is mounted.
Figure 3:
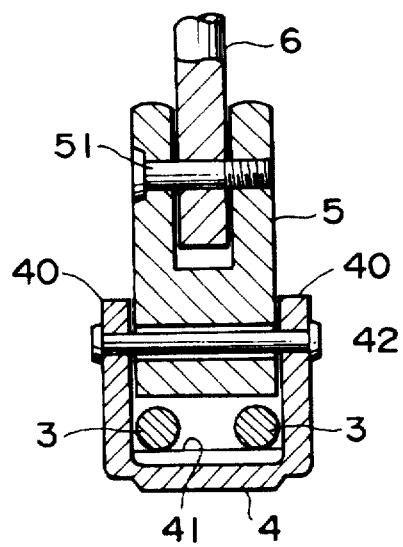
FIG. 3 is a sectional view taken along line 3—3 of FIG. 2.

Reference numeral 4 means a metallic clamp pedestal which is provided in the substantially groove-like form as a whole. As shown in FIGS. 1 and 3, a pair of bearing portions 40, 40 are integrally formed to extend from both sides of the clamp pedestal 4. An inner width of the clamp pedestal 4 is designed such that an interval between the clamped pieces 3, 3 gradually becomes narrower when the clamped pieces 3, 3 are guided as will be described infra. Further, as shown in FIGS. 2 and 3, an inner bottom portion of the clamp pedestal 4 is formed to have a slightly deep intermediate portion 41.

It must be noted that the clamp pedestal 4 is not necessarily provided in the groove-like form as a whole as will be clear from the following description of the operation. It is sufficient to simply provide a groove-like form for the clamp pedestal 4 at least at positions corresponding to the bearing portions 40, 40.

A cam portion 50 is formed at a base end side circumferential portion of a cam piece 5, and the cam piece 5 is horizontally movably and pivotally mounted by a shaft 42 between the bearing portions 40, 40 of the clamp pedestal 4. Further, a temple frame 6 is pivotally mounted by a shaft 51 at a distal end of the cam piece 5 such that the temple frame 6 is capable of being closed in the direction of eyes.

As will be discussed with reference to FIG. 4, the temple frame 6 in the embodiment is bent in the course thereof such that the temple frame 6 substantially agrees with an extension of the clamped pieces 3, 3 in a state in which the temple frame 6 is opened to extend along the clamped pieces 3, 3.

In the mounting structure in the embodiment, as will be discussed infra, the clamp pedestal 4 and the cam piece 5 form a type of cam clamp operated in two directions.

That is, first, the lens 2 is guided into the lens frame 1 while extending an interval of the notch portion 10 in the lens frame 1. As sequentially shown in FIGS. 1 and 2, the clamp pedestal 4 is fitted with the clamped pieces 3, 3 such that the clamped pieces 3, 3 are inserted into the clamp pedestal 4. This makes the interval between the clamped pieces 3, 3 narrower to clamp the lens 2 to the lens frame 1.

In the operation, a spectacles user is able to select an amount of insertion of the clamped pieces 3, 3 into the clamp pedestal 4, thereby adjusting a substantial length of the temple frame 6 (an interval from the lens frame 1 to an unillustrated temple end of the temple frame 6).

Figure 4:
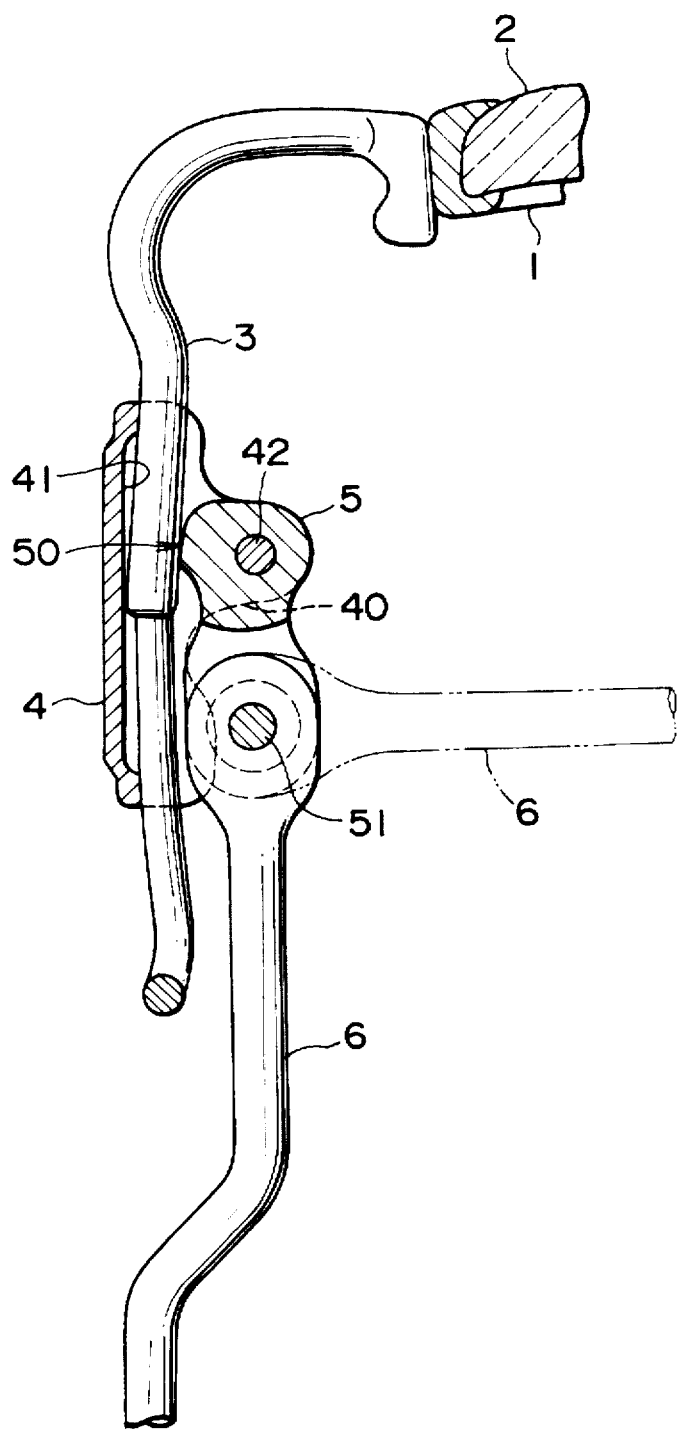
FIG. 4 is a partially enlarged horizontally sectional view showing a state in which the temple frame is mounted and the frame is opened.

Subsequently, the cam piece 5 in the state of FIG. 2 is rotated by substantially 90 degrees to be opened to extend along distal ends of the clamped pieces 3, 3 as shown in FIG. 4. Then, the cam portion 50 of the cam piece 5 strongly presses the clamped pieces 3, 3 to the inner bottom portion of the clamp pedestal 4, thereby clamping the clamped pieces 3, 3 to the inner bottom portion of the clamp pedestal 4.

In this case, if the slightly deep intermediate portion 41 is formed on the inside of the clamp pedestal 4 as shown in FIG. 4, the clamped pieces 3, 3 are clamped to the clamp pedestal 4 in a slightly curved manner so that the cam piece 5 can cause a more preferable clamp operation.

As shown in FIG. 4, when the clamped pieces 3, 3 are clamped to the clamp pedestal 4 by the cam piece 5, the cam piece 5 is opened by only strong opening power. Hence, the temple frame 6 is horizontally moved in a range from a position shown by the solid lines to a position shown by the two dot chain lines in the drawing. In the embodiment, since the temple frame 6 is pivotally mounted at the distal end of the cam piece 5, the clamped pieces 3, 3 inserted into the clamp pedestal 4 serve as a stopper when the temple frame 6 is opened. Thus, the temple frame 6 is not moved over the state of FIG. 4 in which the temple frame 6 extends along the extension of the clamped pieces 3, 3.

The following effects are provided according to the mounting structure in the embodiment 1.

That is, first, since the lens is capable of being fixedly held at the lens frame 1 by simply fitting the clamp pedestal 4 with the clamped pieces 3, 3 in an inserting manner, it is very easy to fix the lens 2 to the lens frame 1, and replace the lens 2.

Second, it is possible to fix the temple frame 6 to the clamped pieces 3, 3 by inserting the clamped pieces 3, 3 into the clamp pedestal 4, and closing the cam piece 5. Thus, it is very easy to mount or replace the temple frame 6.

Third, it is possible to easily adjust the substantial length of the temple frame 6 by the amount of insertion of the clamped pieces 3, 3 into the clamp pedestal 4 in the range of the length of the clamped pieces 3, 3.

Fourth, the clamped pieces 3, 3 are integrally provided to have the U-shaped or V-shaped total form. Hence, the clamped pieces 3, 3 are capable of being easily inserted into the clamp pedestal 4, and a clamp force of the clamp pedestal 4 is easily applied to the lens 2.

Fifth, the clamped pieces 3, 3 inserted into the clamp pedestal 4 serve as the stopper for the temple frame 6.

Embodiment 2

Figure 5:
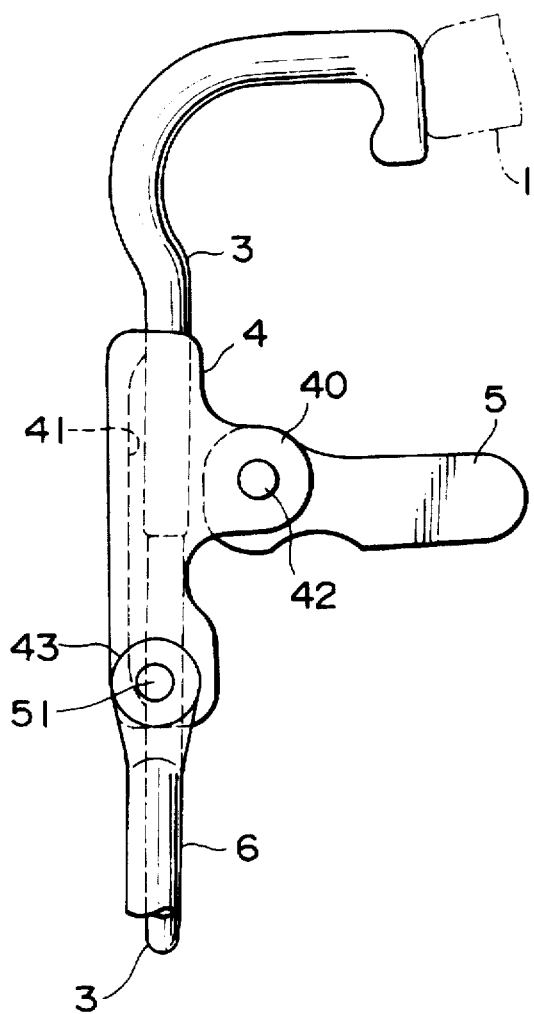
FIG. 5 is a partially enlarged plan view showing the embodiment 2 of a temple frame mounting structure in spectacles according to the present invention.

In the embodiment 2 shown in FIG. 5, a base end of a temple frame 6 is pivotally mounted by a shaft 51 to a bearing piece 43 provided for a clamp pedestal 4. In the embodiment, the bearing piece 43 has an unillustrated stopper to prevent the temple frame 6 from rotating to the left from a state of FIG. 5.

Other structures, operations, effects of the mounting structure in the embodiment 2 are substantially identical with those of the mounting structure in the above embodiment 1, and descriptions thereof are omitted.

Embodiment 3

Figure 6A:
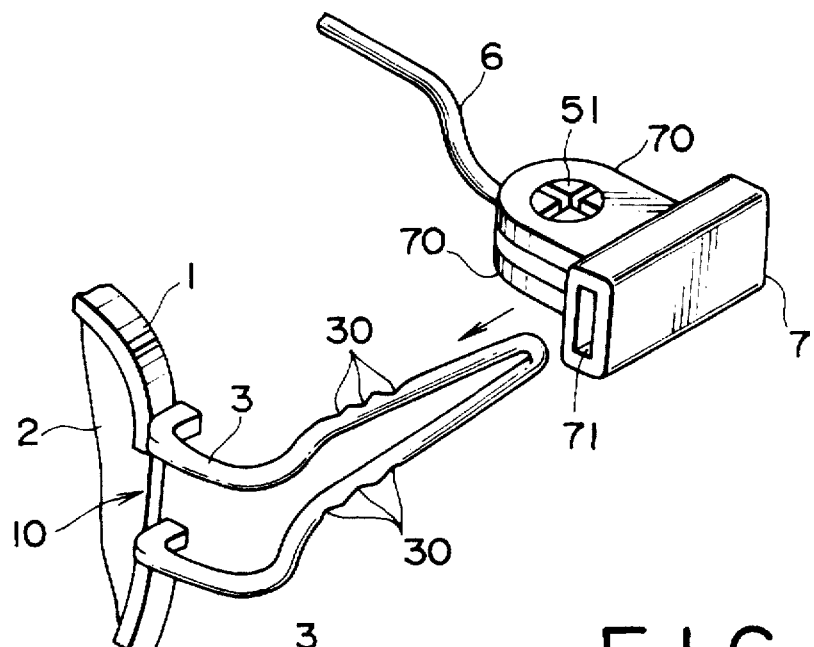
FIG. 6(a) is a partial perspective view showing the embodiment 3 of a temple frame mounting structure in spectacles according to the present invention.
Figure 6B:
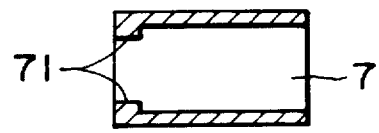
FIG. 6(b) is a sectional view of a clamp in the embodiment 3.

FIGS. 6(a) and 6(b) show the embodiment 3 of a temple frame mounting structure in spectacles according to the present invention.

Substantially like the embodiment 1, base ends of a pair of clamped pieces 3, 3 are secured through welding to ends of a lens frame 1 between which a notch portion 10 is positioned.

Reference numeral 7 means a cylindrical clamp into which the clamped pieces 3, 3 are inserted while an interval therebetween becoming narrower. Bearing portions 70, 70 are formed at a side of the clamp 7 on the side of eyes, and a temple frame 6 is horizontally movably and pivotally mounted by a shaft 51 to the bearing portions 70, 70.

In the clamped pieces 3, 3, irregularities 30 are respectively formed on the clamped pieces 3, 3 on the sides opposed to the mutually opposite sides to extend along a longitudinal direction of the clamped pieces 3, 3. On the other hand, convex portions 71 are provided on the inside of the clamp 7 shown in FIG. 6(b), and are anchored by the irregularities 30 when the clamped pieces 3, 3 are inserted into the clamp 7.

According to the embodiment, when the clamped pieces 3, 3 are pressed into the clamp 7, the clamped pieces 3, 3 are pressed to make the interval therebetween narrower, thereby fixedly holding the lens at the lens frame 1. At the same time, the clamp 7 is fixed to the clamped pieces 3, 3, and the temple frame 6 is mounted to a side of the lens frame 1 through the clamped pieces 3, 3 and the clamp 7. Further, a substantial length of the temple frame 6 is adjusted by adjusting an amount of insertion of the clamped pieces 3, 3 into the clamp 7.

In the embodiment, as set forth above, the irregularities 30 are formed on the clamped pieces 3, 3 to have a multi-stage structure, and convex portions 71 are provided on the inside of the clamp 7 to be anchored by the irregularities 30. Thus, the clamp 7 is hard to be released from the clamped pieces 3, 3.

Figure 7:
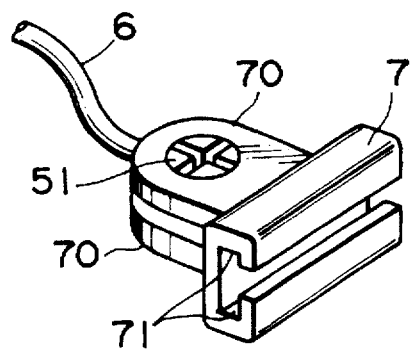
FIG. 7 is a partial perspective view showing a modification of the clamp in the embodiment 3.

In the embodiment 3, it is to be noted that the clamp 7 may have a dovetail groove-like structure as shown in FIG. 7.

Other structures, operations, effects of the mounting structure in the embodiment 3 are substantially identical with those of the mounting structure in the above embodiment 1, and descriptions thereof are omitted.

In the above embodiments, the clamped pieces 3, 3 are integrally provided to have a U-shaped or V-shaped total form thereof. However, it is to be noted that the clamped pieces 3, 3 may separately be formed according to material or a size of a section of the clamped pieces 3, 3. In this case, ends of the clamped pieces 3, 3 are preferably bent in a curly manner.

What is claimed is:

1. A temple frame mounting structure in spectacles, comprising a lens frame with a notch portion provided in a part of an annular side;

a pair of clamped pieces fixed at positions of said lens frame between which said notch portion is positioned, and having distal ends extending apart from said lens frame in a direction of eyes;

a clamp pedestal with a pair of bearing portions formed on both sides, having a groove-like portion into which said pair of clamped pieces are guided while an interval therebetween becoming narrower;

a cam piece horizontally movably and pivotally mounted to the bearing portions of said clamp pedestal, and including a base end having a cam portion to press said pair of clamped pieces guided to the clamp pedestal to the side of an inner bottom portion of said clamp pedestal when the cam piece is closed to extend along said clamp pedestal; and a temple frame horizontally movably and pivotally mounted to a distal end of said cam piece or a part of said clamp pedestal in a state in which the temple frame is capable of being closed on the side of eyes.

2. A temple frame mounting structure in spectacles according to claim 1, wherein an inner bottom portion of said clamp pedestal is formed to have a slightly deep intermediate portion.

3. A temple frame mounting structure in spectacles according to claim 1, wherein distal ends of said pair of clamped pieces are integrally provided to have a substantially U-shaped or V-shaped total form thereof.

4. A temple frame mounting structure in spectacles, comprising:

a lens frame with a notch portion provided in a part of an annular side;

a pair of clamped pieces fixed at positions of said lens frame between which said notch portion is positioned, and having distal ends extending apart from said lens frame in a direction of eyes;

a cylindrical or dovetail groove-like clamp into which said pair of clamped pieces are inserted while an interval therebetween becoming narrower; and a temple frame horizontally movably and pivotally mounted to a part of said clamp in a state in which the temple frame is capable of being closed on the side of eyes.

5. A temple frame mounting structure in spectacles according to claim 4, wherein an irregularity is formed on at least one of said clamped pieces on the side opposed to the mutually opposite sides of the clamped pieces to extend along a longitudinal direction of the clamped piece, and a convex portion is provided on the inside of said clamp to be anchored by said irregularity when said clamped pieces are inserted into the clamp.

6. A temple frame mounting structure in spectacles according to claim 4, wherein distal ends of said pair of clamped pieces are integrally provided to have a substantially U-shaped or V-shaped total form thereof.

* * * * *